United States Patent [19]
LeVay

[11] Patent Number: 5,056,739
[45] Date of Patent: Oct. 15, 1991

[54] SAFETY HARNESS DEVICE

[75] Inventor: Robert C. LeVay, Anaheim, Calif.

[73] Assignee: Pacific Scientific Company, Newport Beach, Calif.

[21] Appl. No.: 444,623

[22] Filed: Dec. 1, 1989

[51] Int. Cl.$^5$ .............................................. B64D 25/115
[52] U.S. Cl. ................................ 244/122 AG; 280/806
[58] Field of Search ........ 244/122 R, 122 AG, 122 B; 242/107, 107.4 R, 107.4 A, 107.4 B, 75.51, 75.53, 107.3; 91/405; 92/85 B; 188/280, 297, 322.14; 137/504; 280/803, 806; 297/388

[56] References Cited

U.S. PATENT DOCUMENTS

| | | | |
|---|---|---|---|
| 3,178,136 | 4/1965 | Bayer | 244/122 AG |
| 3,522,918 | 8/1970 | Wrighton | 280/806 |
| 3,918,545 | 11/1975 | Andres et al. | 244/122 B |
| 4,056,242 | 11/1972 | Herrmann | 244/122 B |
| 4,747,565 | 5/1988 | Spinosa | 244/122 B |
| 4,871,131 | 10/1989 | Bernier et al. | 244/122 AG |

*Primary Examiner*—Galen Barefoot
*Attorney, Agent, or Firm*—Knobbe, Martens, Olson & Bear

[57] ABSTRACT

A safety harness device of the inertia type wherein the rewind spring is connected to a fluid pressure actuated portion that is normally inoperative during ordinary operations of the safety harness, but which, when actuated by the user, serves to pull upon the rewind spring to rapidly haul in the user, without injury to him however, against the back of his seat prior to ejection regardless of accelerating forces obtaining at that time. A pressure responsive regulator valve provides substantially constant flow of control fluid to control the velocity of the haulback force.

7 Claims, 4 Drawing Sheets

SAFETY HARNESS DEVICE

FIELD OF THE INVENTION

This invention relates generally to safety harness devices for use in protecting persons in moving vehicles, especially aircraft, and more particularly to a safety device employing gas pressure for effecting rapid pull-back of the user prior to ejection of the user from the vehicle, as during emergencies.

BACKGROUND OF THE INVENTION

When an airplane pilot, or other user of a safety harness device, is to be ejected from an airplane in an emergency situation, it is important that the user be in an upright position in his seat in order to withstand the ejection forces involved without sustaining injury, and in order to avoid hitting the surrounding structure of the vehicle during the ejection process. It is also important that the retraction system be able to satisfactorily accommodate users of different weights during the various ambient conditions the user may encounter.

It is further desirable that the user be restrained when acceleration forces on the user relative to the vehicle exceed a certain level. At the same time, the user's normal movements should be unrestrained when acceleration forces are below this level. It is further desirable that the pull-back capability be operable regardless of the inertia forces affecting the inertia operated restraining capability. It is further highly desirable that the pull-back capabilities and the inertia operated restraint capabilities be combined into a single safety device.

U.S. Pat. No. 3,522,918—Wrighton discloses a safety harness device of the inertia type wherein a rewind spring in the device is connected to a fluid pressure actuated portion that is normally inoperative during ordinary operations of the safety harness. However, when actuated by the user, the fluid pressure actuated portion serves to pull upon the rewind spring to rapidly haul in the user, without injury, against the back of the seat prior to ejection, regardless of decelerating forces on the user at that time. That patent, which is incorporated herein by reference, utilizes the high pressure gases from an explosive device to provide the force in emergency situations for retracting a strap to haul back the user against his seat. The inertia responsive portion of the safety harness device disclosed in Wrighton is similar to that disclosed in U.S. Pat. No. 3,018,065—Cushman et al, which is incorporated herein by reference.

According to the Wrighton patent, a rewind spring means of the inertia responsive safety harness device, of the type disclosed in the Cushman, et al. patent, instead of being connected to the harness casing, is connected to a rotatable drum mounted in the ballistic portion of a safety harness device. That drum is normally fixed against turning during all normal operations of the device. However, should the pilot or user wish to eject from his vehicle, means are provided for rotating the drum so as to wind the rewind spring means thereon to cause turning of the reel spindle and effect rapid retraction of the strap, thereby moving the user's body rapidly but safely against the back of his seat preparatory to ejection.

More specifically yet, the Wrighton patent employs the high pressure gas to move a piston, which in turn drives a ball screw utilized to wind the retracting spring. To dampen the movement of the piston, in an attempt to provide some uniformity to the retracting force, back pressure is created by fluid on the backside of the piston. This fluid is forced out of a restricted fixed orifice to thereby create a dashpot effect for the piston movement.

A safety harness device of the type disclosed in the Wrighton patent has been very successful for many years and thousands of units have been utilized. However, more stringent specifications have now been established for the operation of such devices because of increased speeds and other capabilities in modern aircraft. For example, existing reels have been designed to haulback 98 percentile pilots undergoing 2 g's resistance acceleration in less than 300 milliseconds. In other words, a heavy pilot being pulled away from his seat by 2 g's acceleration must be hauled back in less than 300 milliseconds. At the other end of the performance scale, the reel must not haulback the 3 percentile (light) pilot (with no resistive acceleration) faster than 12 fps (feet per second) to prevent injury. It is desirable that a new system will be capable of hauling back the 98 percentile pilot undergoing 3.5 g's resistive acceleration in less than 200 milliseconds, while still limiting velocity of the pilot to 12 fps with the light (3 percentile) pilot.

This goal can be accomplished with the heavy pilot by simply increasing the retraction force, by increasing the actuating fluid pressure with a device of the type disclosed in the Wrighton patent. However, to be practical, the device must perform satisfactorily without injury to the user of a certain maximum weight, as well as a pilot of a certain minimum weight. In addition, the forces provided by a particular pressurized fluid are affected by ambient conditions. That is, with high ambient temperatures, the fluid pressure provided by a particular explosive device is greater than that provided by the same device with cold ambient temperatures.

As stated more succinctly, the desired device must be able to successfully haul back a pilot of a maximum weight on a cold day against high resistance acceleration forces and also be able to haul back the lightest pilot on a hot day with no resistance acceleration force, without injuring the lightweight pilot. While the device described in the above-referenced Wrighton patent satisfactorily accommodates various loads by the use of the above-mentioned dashpot feature, it cannot meet the newer, more stringent requirements needed in connection with modern military aircraft. If the system in the Wrighton patent is simply modified to provide the necessary force for the heaviest pilot on the cold day, the lightweight pilot on a hot day will likely be seriously injured because of the force with which such load will be hauled back into the upright position against the pilot's seat.

A problem of this sort has been addressed by a relatively complicated and expensive system wherein the velocity of the driving piston or actuator is sensed and the information is fed to a computer which controls a valve to control back pressure on the actuator. Primarily because of cost and size, such system has not been widely adopted.

Accordingly, a need exists for a simple, improved safety harness device which will meet the newer, more stringent requirements. Further, such improvement must be highly reliable and fit within the space limitations of the existing structure. More specifically yet, it is desirable that the improved system fit within the space envelope of the product currently made in accordance with the Wrighton patent.

SUMMARY OF THE INVENTION

Briefly stated, the invention provides a system wherein the haul back forces generated on a user during an emergency situation prior to ejection from a vehicle are limited to a substantially constant velocity, regardless of the weight of the user, within the target weight ranges. In a preferred form of the invention, the safety harness device includes a casing, a spindle rotatably mounted in the casing and a flexible element, such as a strap wound on the spindle and extendable outwardly of the casing for connecting to the safety harness of a user. The element, of course, can be unwound during normal movements of the user in his seat. A mechanism responsive to fluid pressure rotates the spindle to wind the strap, and thereby haul the user firmly against the back of his seat in an emergency situation, prior to ejection of the user and his seat from the vehicle. A source of fluid pressure is applied to the mechanism to rotate the spindle to rewind the strap. A constant flow valve controls the application of the fluid pressure to rewind the element in a manner such that the haul back force is limited to substantially constant velocity independent of the weight of the user.

In a preferred form of the invention, there is provided a piston mounted within a housing and connected for driving a drum. Strap rewind springs are connected between the spindle and the drum, but the drum is held against turning movement during normal operations. The rewind springs permit unwinding of the strap and cause rewinding during normal movements of the user in his seat. The source of fluid pressure is connected to the housing to drive the piston in an emergency, causing yielding of the drum holding means and causing rotation of the drum and the winding of the rewind spring on the drum to rewind the strap and draw the user firmly against the back of his seat prior to ejection. A driving connection between the piston and the drum includes a hollow ball screw nut abutting the piston and a hollow ball screw shaft engaging the nut. The nut and the shaft, as well as the housing surrounding them, are normally filled with hydraulic fluid. The control valve is positioned within the ball screw shaft that controls the flow of hydraulic fluid out of the housing as fluid pressure is applied to the opposite side of the piston. The control valve is adjustable to provide a substantially constant flow through the valve as pressure varies. This constant dashpot effect ensures substantially constant velocity winding of the drum and hence, substantially constant velocity winding of the rerun spring. The orifice through the valve therefore increases as pressure decreases, and decreases as pressure increases, to maintain a constant flow.

DETAILED DESCRIPTION OF THE PREFERRED EMBODIMENT

Figure 1:
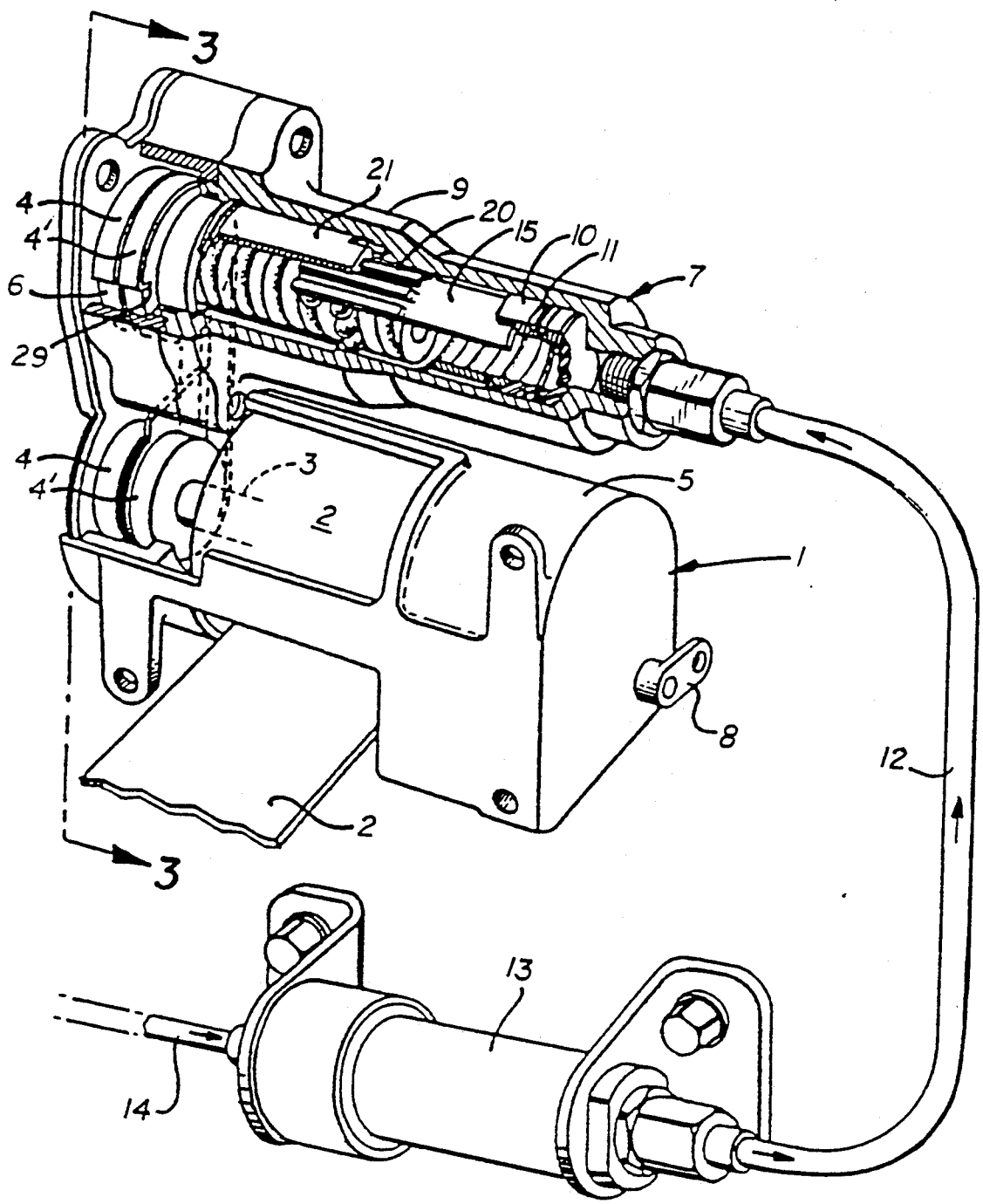
FIG. 1 is a perspective view, with portions broken away, of a safety harness, incorporating the structure of the present invention; however, the only structure illustrated in this view is identical to that in U.S. Pat. No. 3,522,918.
Figure 2:
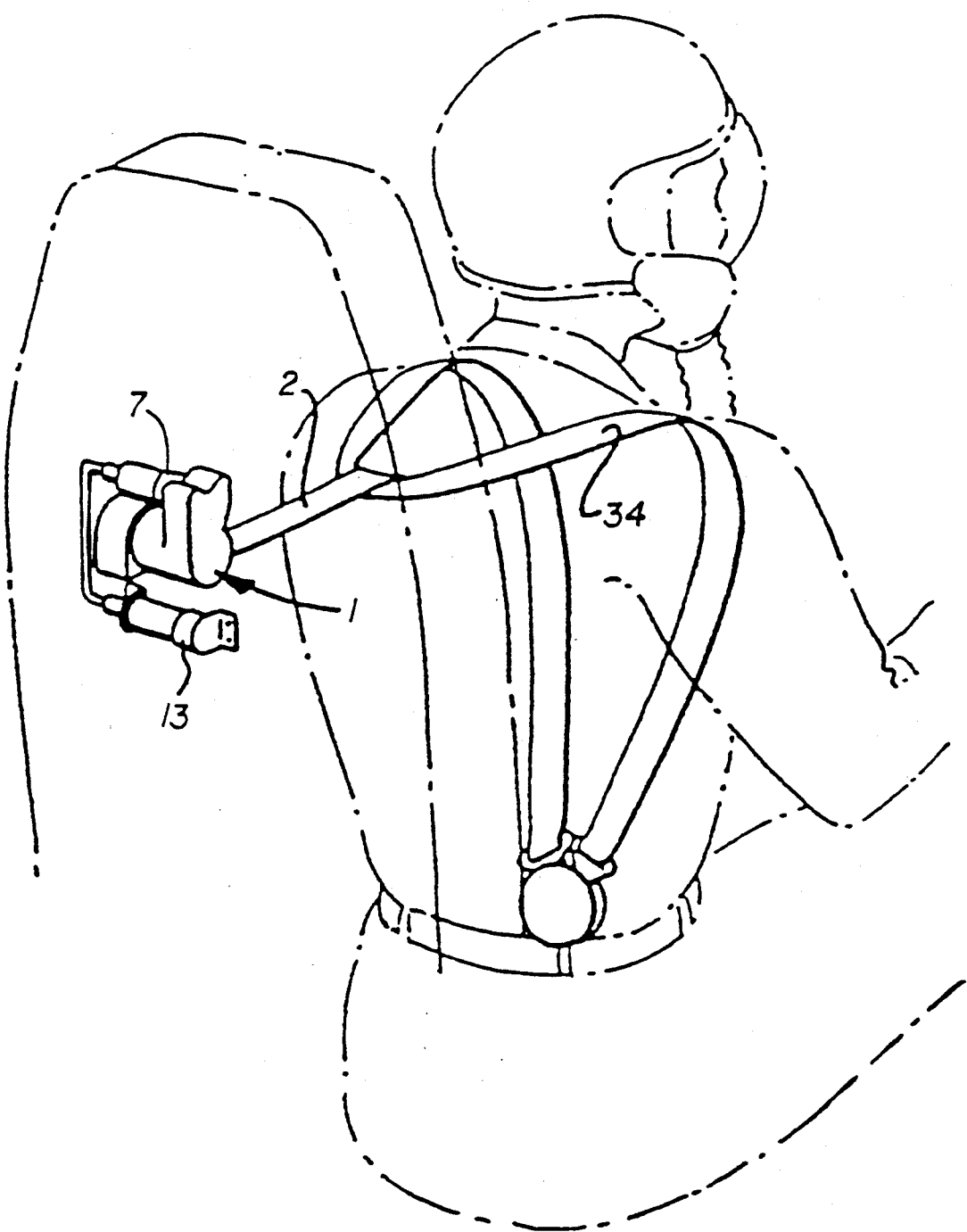
FIG. 2 is a schematic view of a typical installation of the safety harness device of FIG. 1.

Referring now to FIGS. 1-4 of the drawings, the reference numeral 1 designates the inertia responsive portion of the safety harness device of this invention, shown as of the type disclosed in U.S. Pat. No. 3,018,065. In fact, FIGS. 1-4 are essentially like FIGS. 1-4 of the Wrighton patent, except for the introduction of a flow control valve 27, discussed below. The device has a strap, which can also be a cable or other flexible element if desired, that is wound on a shaft or spindle 3 of the device 1. The outer end of the strap is adapted to be connected to the shoulder harness 34 of the pilot or user, as illustrated in FIG. 2. The device 1 has a locking ratchet wheel 32 and an inertia fly wheel 34, together with associated parts, as described in U.S. Pat. No. 3,018,065. The safety device 1 is normally mounted on the back of the user's seat or in some other convenient location in close proximity to the user. The inertia-responsive portion of the safety harness device acts to lock the strap 2 against payout. In the event of excessive accelerations of the body of the user, and as also shown having a manually operated locking lever 8, all as disclosed in U.S. Pat. No. 3,018,065.

The safety device portion 1 is shown provided with rewind spring means consisting of two rewind springs 4 and 4'. These springs have their inner end portions wound around and secured to the reel shaft 3 at 35, and their outer ends extend outwardly of the casing 5. These outer ends are connected to the peripheral portion of a drum 6, of a fluid pressure actuated portion 7 of the reel with the springs normally extending around the drum, as shown in FIG. 1. Either of the rewind springs 4 and 4' is made strong enough to effect rewinding of the reel shaft 3 in use. Thus, one spring could be used alone, but two springs add to the reliability of the device in emergencies.

The device portion 7 comprises a housing or a cylinder 9 within which is slidably mounted a hollow piston 10 having an O-ring seal 11. The piston 10 is normally positioned at one end of the cylinder, to which end the conduit 12 is connected. The conduit leads to a fluid pressure source or cartridge 13 that is adapted to be fired as by a blow upon a cartridge plunger 14. The conduit 12 and the interior of the cylinder 9 are preferably filled with a suitable oil or grease, such as silicone oil or grease, which in practice enables the fluid pressure source or cartridge 13, when discharged, to rapidly build up a high pressure for moving the grease or oil against the inlet side of the piston 10, and hence move the piston within the cylinder 9. The piston normally abuts the ball screw nut 15 extending within the cylinder 9. The nut is internally helically grooved at 16, having balls 17 therein, engaging conforming helical grooves 18 in an inner ball screw hollow shaft 19. The shaft has one end portion extending into the ball screw nut 15, and has the drum 6 secured upon its other end portion. The drum is connected to the outer end portions of the rewind springs 4 and 4', as by having their turned over ends engaged in slot 29 and drum 6. The ball screw nut 15 is provided with longitudinal spines 20 which project into slots provided in a conforming sleeve 21, fixed as by pins 22 and a shim 31 within the cylinder 9.

The hollow ball screw nut 15 and hollow ball screw shaft 19 form chambers which are normally also filled with a suitable oil or grease, such as a relatively low viscosity silicon oil, or other hydraulic fluid, such as in conduit 12. This grease also surrounds the ball screw shaft 19 within the cylinder 9. Connecting orifice 22' and 23 within ball screw 19 are adapted to convey this grease, during operation of the actuated portion of the safety device, to a rupture disk 24. The disk will rupture in use, allowing the hydraulic fluid to escape from the interior of cylinder 9. In accordance with the invention, the fluid flows through a constant flow control valve 27 and out past ball bearings 25. The drum 6 is supported in a combined radial and thrust ball bearing 25 at one end thereof, and is turnably mounted within the cylinder 9 at the other end thereof. An O-ring seal 26 is provided between the drum 6 and the interior wall of cylinder 9 to prevent the escape of hydraulic fluid in use.

Figure 4:
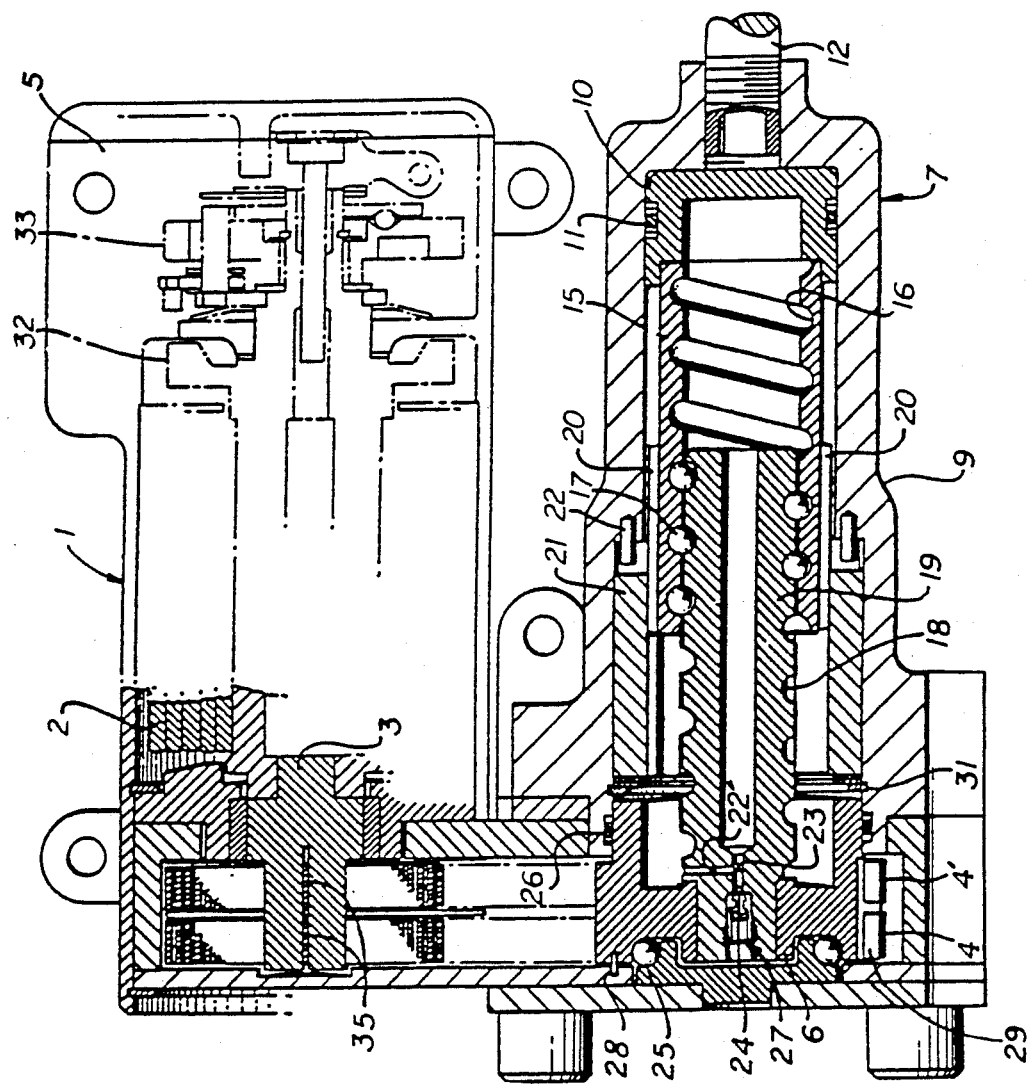
FIG. 4 is an enlarged fragmentary sectional view taken along lines 4—4 of FIG. 3 schematically illustrating the flow control valve of the present invention.
Figure 3:
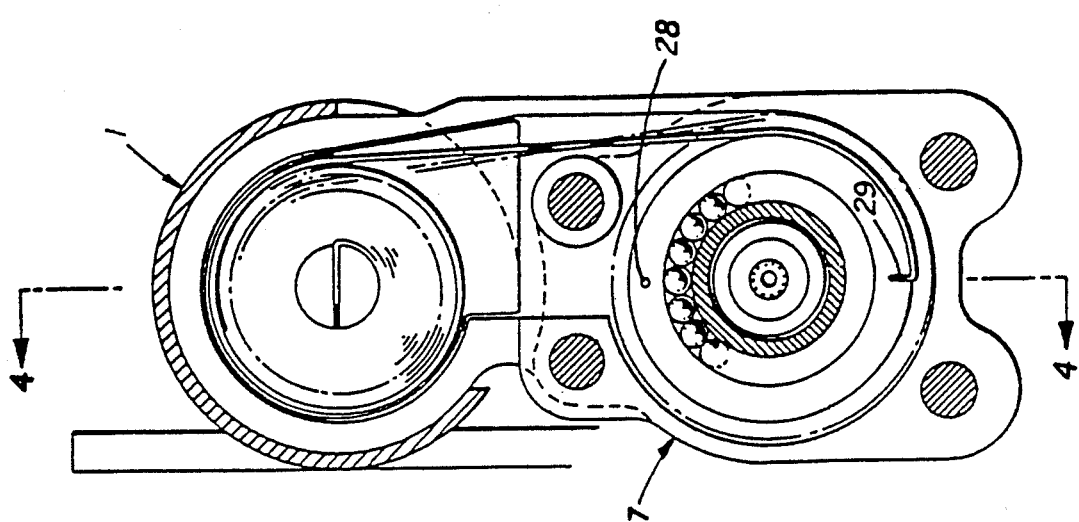
FIG. 3 is an enlarged sectional view taken along lines 3—3 of FIG. 1.
Figure 5:
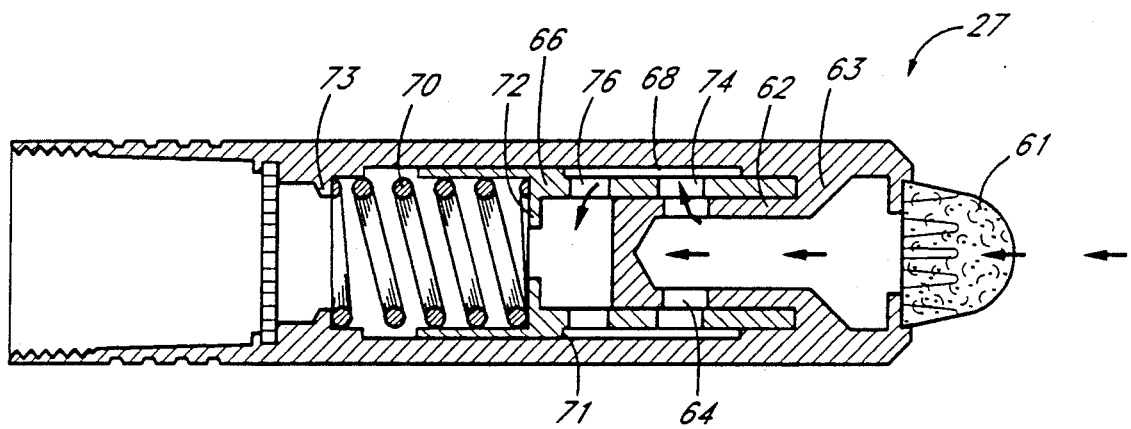
FIG. 5 is a cross-sectional view of the flow control valve of the present invention with the valve in its fully open position.

Referring to FIG. 5, it may be seen that the control valve 27 has a generally tubular configuration that fits within the end of the hollow shaft 19, as seen in FIG. 4. The valve includes a tubular housing 60 with an optional filter 61 positioned at the inlet end of the valve, leading to gaps adjacent the ball bearings 25. The inlet end of the housing 60 opens to the interior of a cylindrical valve seat 62 which is supported in cantilever fashion by an outwardly extending flange 63 formed integral with the interior wall of the casing 60. The main portion of the valve seat 62 is spaced inwardly from the interior wall of the housing 60. The downstream end of the valve seat is closed. A series of circumferentially spaced holes 64 in the side wall of the valve seat 62 interconnect the upstream and downstream ends of the valve. A sleeve-like tubular valve element 66 has its upstream end slidably positioned on the valve seat 62, and forming an annular passage 68 between the valve element 66 and the adjacent cylinder wall. The downstream end of the valve element 66 is slidably positioned within the surrounding wall of the housing 60. A spring 70 is positioned within the downstream end of the valve element 66, being compressed between an inwardly extending flange 72 in the valve element and a fixed inwardly extending flange 73 on the housing. The spring urges the valve element towards the upstream end of the housing. A series of holes 74 are positioned in the upstream end of the valve element, being circumferentially spaced to be circumferentially aligned with the holes in the valve seat. The holes 74 are substantially axially aligned with the holes 64 in the valve seat in the valve open position, as illustrated in FIG. 5. Together these holes define a variable inlet orifice. The valve element 66 is also provided with a second series of circumferentially spaced holes 76, downstream of the holes 74 adjacent the valve seat holes.

In operation of the control valve 27, the valve element is urged into the fully open position of FIG. 5 by virtue of the coil spring biasing the valve element in that direction. In that open position, the adjacent holes of the valve element are axially and circumferentially aligned with the holes in the valve seat such that fluid flow passes through the valve seat, through the valve element and into the annular space 69 surrounding the valve element. The flow then passes inwardly through the second series of holes in the valve element into the interior of the valve housing, where it exits at the downstream end of the housing. Fluid pressure introduced into the annular space 68 surrounding the valve element reacts against an annular shoulder 71, at the downstream end of that chamber, facing in the upstream direction. The resulting force applied to the shoulder urges the valve element to move axially against the bias of the spring. Movement of the valve element in that direction moves the series of holes 74 of the valve element 66 axially so that they are less aligned with the holes 64 in the fixed valve seat, thus creating a variable inlet orifice for the valve. As the fluid inlet pressure increases to the level sufficient to move the valve element, the size of the variable orifice decreases. Conversely, as the inlet pressure decreases, the size of the variable orifice increases. The valve is constructed such that the flow through the orifice is regulated so as to be substantially constant. That is, a high pressure with a small orifice will permit the same flow as lower pressure in a larger orifice.

While various constant flow regulator valves may be available, one that has been used in a photograph is from The Lee Co., 2 Pettipaug Road, Westbrook, Conn. This preferred construction is patterned after Lee part no. FLRA 2812310D. That particular model has a flow of 1 gal./min. with a maximum pressure differential of 3,000 psi. However, for the system described herein, a flow of 3 gal./min. is desired with a maximum pressure differential of 12,000 psi.

Figure 6:
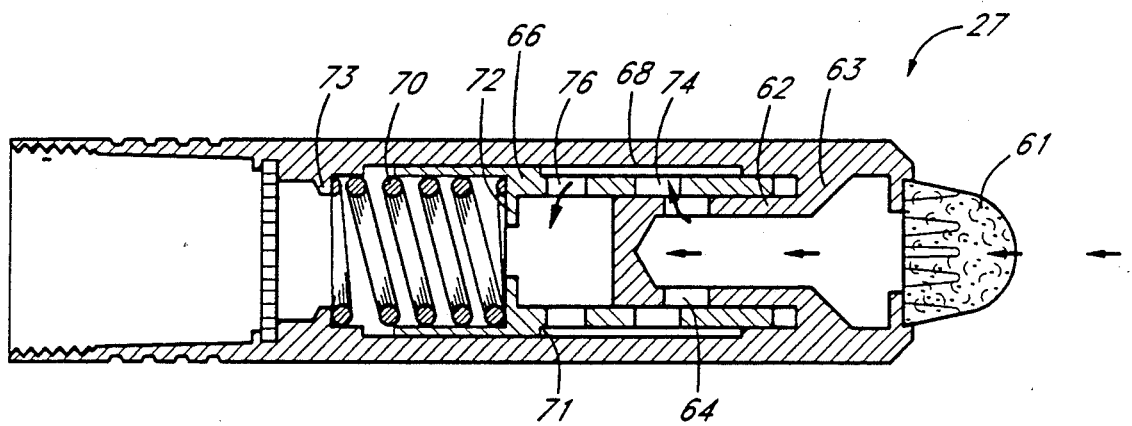
FIG. 6 shows the valve of FIG. 5 with the valve orifice only partly open.

In operation of the system, when the user desires to eject from the vehicle, he will actuate plunger 14, or use other means for initiating the ballistic cartridge or other source of fluid pressure 13. Owing to the confinement of the gases within the source 13, due to the presence of the hydraulic fluid within tubing 12, there will then be a rapid build-up in pressure which will force the hydraulic fluid and piston 10 towards the left, as viewed in FIGS. 1 and 3. As this piston moves toward the left, it will also move ball screw 15, causing the rapid turning of the ball screw shaft 19 and consequent turning of the drum 6. The hydraulic fluid within the cylinder 9 will break the rupture disk 24, and this fluid will escape through the valve 27. However, this controlled escape of fluid gives the device a dashpot action so that excessive acceleration of the shoulder harness strap against the chest of the user is prevented. Thus, the user is moved back rapidly but without the exertion of dangerous forces upon his chest. As is explained above, the valve 27 provides for a constant flow, substantially independently of the haul back load. Thus, with a heavy pilot, a maximum percentage of the energy provided by the pneumatic pressure from the explosive device is transmitted to the drum 6, and hence to the pull-back strap. Thus, the pressure on the regulator valve 27 is minimized such that the regulator valve orifice remains in its fully opened position of FIG. 5 so that the piston can move at maximum speed to rotate the drum. Conversely, with a lightweight pilot, there is a lesser load on the strap, drum and piston, such that increased pressure is transmitted to the flow regulator valve, thereby decreasing the size of the orifice as shown in FIG. 6. This maintains a constant flow through the valve, and hence a substantially constant velocity on the spindle driving the haul back strap. Thus, with the full range of the designed system, the haul back strap moves at substantially the same velocity, regardless of the load. Technically the strap velocity changes with a constant rotational velocity of the spindle, due to the winding of the strap on the spindle, but this can be calculated so as not to exceed a predetermined velocity of the strap.

The actuated portions 7 of the device will operate satisfactorily regardless of the position of the user, whether he is leaning forward or is positioned towards the back of his seat. Nevertheless, the drum 6, acting through the rewind springs 4 and 4', will turn the reel shaft to pull the strap inwardly of the reel casing to quickly position the user against the back of his seat. Preferably, a small air bubble is generally allowed to remain in the oil within casing 9 to allow for expansion. This air bubble is compressed and its effect eliminated by the initial travel of the piston 10. This same initial travel is also used to tighten the approximately one-half turn of slack provided in the springs 4 and 4' on the full haul back; therefore, even on a partial haul back, there is no high shock loads applied to the retraction springs or harness reel.

It will be noted that the drum 6 is held against turning during ordinary locking operations of the inertia-responsive portion 1 of the safety harness device as by a shear pin 28, but this pin will shear when the actuated portion 7 functions. Thus, it will be seen that there is no turning of the drum 6 and of the ball screw shaft 19, nor movement of the ball screw nut 15 during ordinary operation and locking of the inertia portion of the reel. Thus, the seals, such as 11 and 26, are not worn in normal use of the device, and the parts of the actuated portion 7 remain tight and reliable up to the time of their use during ejection.

It will be noted that the double use of the springs 4 and 4' not only serving as rewinding springs for the inertia portion of the safety harness device, but also serving as a means for pulling the user to the back of his seat before ejection due to the rotation of the drum 6, eliminates the need for a gear train between these two portions of the device. Hence, it also eliminates the necessity for turning the drums 6 whenever the reel shaft 3 turns.

The pressure cartridge 13 is located remotely and plumbed to the inlet of the ballistic reel. When this is done, the length of the connecting high pressure tubing 12 represents a variation in the initial volume into which the ballistic cartridge will be fired. Any change in the initial volume greatly affects the amount of usable energy available for the power haul back. The greater the initial volume, the less energy there will be available, and, of even greater significance, the slower the cartridge will run, and therefore the lower the initial operating pressures will be. The initial operating pressure is critical in that this is the pressure that starts the haul back, and therefore greatly affects the total time required.

One of the features of the unique haul back system of the invention is that it can be incorporated into an existing inertia reel system, as is described above. On the other hand, it will be appreciated that the haul back capability can be employed independently, that is, without an inertia operated strap movement limiting mechanism. Also, while there are advantages to the spring arrangement described above, a gear connection between an inertia operated portion of the device could be combined with a haul back portion by way of gearing.

What is claimed is:

1. A safety harness device comprising:
   a rotatably mounted spindle;
   a flexible element wound on the spindle and extendable outwardly for connecting to the safety harness of a user, said spindle permitting unwinding of said element during normal movements of the user in his seat;
   a mechanism responsive to fluid pressure to rotate said spindle to rewind said element and thereby haul the user firmly against the back of his seat in an emergency;
   a conduit connecting a source of fluid pressure to said mechanism to operate said spindle to rewind said reel; and
   a fluid operated flow control valve for controlling the application of said fluid pressure to rewind said element in a manner such that users of different weights are hauled back with substantially the same velocity, said valve being positioned to control the bleeding of fluid back pressure generated in said mechanism when the fluid applied through said conduit is applied to said mechanism.

2. The device of claim 1, wherein said control valve employs a spring-loaded movable valve element which permits a substantially constant flow of fluid through said valve.

3. A safety harness device comprising:
   a rotatably mounted spindle;
   a flexible element wound on the spindle and extendable outwardly for connecting to the safety harness of a user, said spindle permitting unwinding of said element during normal movements of the user in his seat;
   a mechanism responsive to fluid pressure to rotate said spindle to rewind said element and thereby haul the user firmly against the back of his seat in an emergency;
   a conduit connecting a source of fluid pressure to said mechanism to operate said spindle to rewind said reel; and
   a fluid operated flow control valve for controlling the application of said fluid pressure to rewind said element in a manner such that users of different weights are hauled back with substantially the same velocity;
   said mechanism including a piston having an inlet side exposed to said fluid pressure, the piston being connected to rotate said spindle in response to said fluid pressure, a backside of said piston being in communication with a closed chamber filled with fluid, and said control valve forms a part of said mechanism, with the valve being positioned to control the flow of fluid out of said chamber as fluid is applied to the inlet side of said piston, said valve being adapted to permit a substantially constant flow of fluid, which in turn results in a substantially constant rotational velocity of said spindle.

4. A safety harness device, comprising:
   an inertia responsive portion having a casing;
   a spindle rotatable within said casing;
   a strap wound on said spindle and extending outwardly of said casing for connection to the safety harness of a user, said device having a fluid pressure actuated portion comprising a housing adjacent said inertia portion;
   a drum rotatable within said housing;
   a piston within said housing connected for driving said drum;

a rewind spring connected between said spindle and said drum, structure holding said drum against turning movement during normal operation of said inertia-responsive portion, said rewind spring means permitting unwinding of said strap and causing rewinding thereof during normal movements of the user in his seat; and a conduit connecting a source of fluid pressure to said housing to drive said piston, the activation of the fluid pressure source in an emergency, causing yielding of said drum holding structure to effect the rotation of said drum and the winding of said spring thereon, thereby rotating said spindle to rewind said strap and draw the user firmly against the back of the seat prior to ejection, said fluid pressure actuated portion includes a flow regulator valve responsive to the fluid pressure applied to it to control the movement of said piston to provide a substantially constant velocity on the rotation of said spindle during the rewinding of said strap.

5. The device of claim 4, wherein a driving connection is included between said piston and said drum, said driving connection including a hollow ball screw nut abutting said piston and a hollow ball screw shaft engaging said nut, said nut and shaft, as well as said housing and conduit, being normally filled with hydraulic fluid, the movement of said piston causing telescoping of said nut and shaft, said regulator valve having an adjustable orifice therein which allows the hydraulic fluid to escape from said housing at a substantially constant flow to provide substantially constant velocity for the safety harness upon the user, substantially independently of the weight of the user.

6. A method of automatically providing a force on a pilot or other user of a safety harness which will safely haul such user against the back of a seat, regardless of whether the user is the heaviest or lightest of an acceptable range of users, said method comprising:

applying fluid pressure to a mechanism for rewinding a flexible element attached to the user's safety device; and utilizing a pressure responsive flow regulator to control the rewinding force provided by said mechanism to produce rewinding of said element at a substantially constant velocity;

said applying step including applying said pressure to an inlet side of a piston connected to rewind said element, and said controlling step including bleeding fluid back pressure on a backside of said piston to provide said constant velocity.

7. The method of claim 6, including bleeding the back pressure fluid at a substantially constant flow.

* * * * *